(12) United States Patent
Clarke et al.

(10) Patent No.: US 8,938,795 B2
(45) Date of Patent: Jan. 20, 2015

(54) SYSTEM FOR REAL-TIME CROSS-DOMAIN SYSTEM PACKET FILTERING

(71) Applicant: Owl Computing Technologies, Inc., Ridgefield, CT (US)

(72) Inventors: Frederick Clarke, New Milford, CT (US); Jeffrey Menoher, Ridgefield, CT (US); Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 108 days.

(21) Appl. No.: 13/680,468

(22) Filed: Nov. 19, 2012

(65) Prior Publication Data

US 2014/0139737 A1    May 22, 2014

(51) Int. Cl.
 *G06F 9/00* (2006.01)
 *H04N 21/00* (2011.01)

(52) U.S. Cl.
 CPC .................................... *H04N 21/00* (2013.01)
 USPC .......................................................... 726/13

(58) Field of Classification Search
 None
 See application file for complete search history.

(56) References Cited

U.S. PATENT DOCUMENTS

| | | | |
|---|---|---|---|
| 5,703,562 A | 12/1997 | Nilsen | |
| 8,068,415 B2 | 11/2011 | Mraz | |
| 2007/0234414 A1* | 10/2007 | Liu | 726/11 |
| 2007/0266032 A1* | 11/2007 | Blumenau | 707/10 |
| 2010/0209014 A1* | 8/2010 | Jennings et al. | 382/260 |
| 2011/0090399 A1* | 4/2011 | Whitaker et al. | 348/500 |
| 2011/0197281 A1* | 8/2011 | Alme et al. | 726/24 |
| 2012/0014254 A1* | 1/2012 | Todd et al. | 370/235 |
| 2012/0030768 A1* | 2/2012 | Mraz et al. | 726/26 |
| 2012/0113091 A1* | 5/2012 | Isaacson | 345/418 |
| 2013/0111567 A1* | 5/2013 | Xue et al. | 726/4 |

\* cited by examiner

*Primary Examiner* — Saleh Najjar
*Assistant Examiner* — William G O'Hara
(74) *Attorney, Agent, or Firm* — John S. Economou

(57) ABSTRACT

A system for filtering a digital signal transmitted in a protocol featuring multi-level packetization from a first server to a second server. The first server is coupled to the second server via a one-way data link. The system includes a filter having an input for receiving the digital signal and an output. The filter is configured to analyze the digital video signal and determine whether the digital signal violates one or more predetermined criteria. The filter may be within the first server, or alternatively, within the second server. The predetermined criteria may be unauthorized security level information included within metadata transmitted with the digital video signal. The predetermined criteria may also be format information that, when not conformed to, indicates potential malware or other bad content included within the digital video signal. The filter provides low data transfer latency and/or decoupling of data filter latency from data transfer latency.

59 Claims, 5 Drawing Sheets

SYSTEM FOR REAL-TIME CROSS-DOMAIN SYSTEM PACKET FILTERING

FIELD OF INVENTION

This invention relates generally to a system for real-time cross-domain system packet filtering, and in particular, a system for real-time cross-domain system filtering of packets of digital information.

BACKGROUND OF THE INVENTION

One form of conventional digital video transmission involves transmitting an MPEG-2 Transport Stream (TS) consisting of a series of digital packets of information. The information stored with the TS can include Key Length Value (KLV) metadata. In some situations, the TS may be transmitted from a higher security domain to a lower security domain. In other situations, the TS may be transmitted from a lower security domain to a higher security domain. The TS packets often are included within UDP packets for transmission.

When the TS is transmitted from a higher security domain to a lower security domain, it is important to ensure that the transmission of the content of such TS does not violate any security policy. For example, the video content of TS may include KLV metadata indicating that the associated video is designated Top Secret. Thus, it is important to ensure that the transfer across the security domains does not permit unauthorized, uncontrolled distribution of material, e.g., that such Top Secret video is not transmitted to a lower security domain. Similarly, when the TS is transmitted from a lower security domain to a higher security domain, it is important to ensure that no malware or other inappropriate information/data (e.g., botnets or "dirty" words) exists within the KLV metadata.

Highly engineered solutions, such as the Owl Computing Technologies Dual Diode, (described in U.S. Pat. No. 8,068,415, the disclosure of which is incorporated herein by reference) provide a direct point-to-point optical link between network domains in the low-to-high direction or in the low-to-high direction. The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown in block diagram form in FIG. 1, a first server (the Blue Server) 101 includes a transmit application 102 for sending data across a one-way data link, e.g., optical link 104, from a first network domain coupled to server 101 to a second network domain coupled to server 111. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 111 is only able to receive data from first server 101, since it does not include any transmit circuitry (e.g., an optical emitter comparable to emitter 103).

It is an object of the present invention to provide a system for real-time cross-domain system packet filtering.

SUMMARY OF THE INVENTION

The present invention provides a system for transmitting a digital signal, which may be a video signal, from a first server, which may have a first security level, to a second server, which may have a second different security level. The first server is coupled to the second server via a one-way data link. The system includes a filter having an input for receiving the digital signal and an output. The filter is configured to analyze the digital signal and determine whether the digital signal violates one or more predetermined criteria. In an embodiment, the filter is within the first server. In another embodiment, the filter is within the second server. The filter may be configured to block the digital signal from passing to the output of the filter when the digital signal violates the one or more predetermined criteria. In addition, the filter may be also configured to generate an alert message and/or record a message in a log file when the digital signal violates the one or more predetermined criteria. Alternatively, the filter may be configured to allow the digital signal to pass to the output of the filter and to generate an alert message and/or record a message in a log file when the digital signal violates the one or more predetermined criteria. The one or more predetermined criteria may comprise a format structure of the digital signal and/or a predetermined security level. In a further embodiment, the first security level may be higher than the second security level and the predetermined security level may be the same as the second security level. In a still further embodiment, the filter analyzes the digital signal by extracting metadata included within the digital signal and compares a content of the metadata with the one or more predetermined criteria to determine the violation. The digital signal may comprise Transport Stream packets within UDP packets. The metadata may comprise KLV data within the Transport Stream packets. The digital signal may comprise a sequence of blocks of information and the filter may prevent each block of information from passing to the output of the filter until after the determination of whether the digital signal violates one or more predetermined criteria is complete. The digital signal may comprise a sequence of blocks of information, and the filter may immediately forward each block of information to the output of the filter and perform the determination of whether the digital signal violates one or more predetermined criteria in a background operation.

In a still further embodiment, the invention is a system for transmitting a digital signal, which may be a digital video signal. The system includes a first server having a first security level and a filter within the first server having an input for receiving a digital signal and an output, wherein the filter is configured to analyze the digital signal and determine whether the digital signal violates one or more predetermined criteria. The system also includes a one-way transmission system having an input coupled to the output of the filter and an output; and a second server, which may have a second different security level, the second server being coupled to the output of the one-way transmission system.

In yet another embodiment, the invention is a system for transmitting a digital signal, which may be a digital video signal. The system includes a first server having a first security level and a one-way transmission system having an input within the first server for receiving a digital signal and an output. The system also includes a second server, which may have a second different security level, the second server being coupled to the output of the one-way transmission system, and a filter within the second server having an input coupled to the output of the one-way transmission system and an output, wherein the filter is configured to analyze the digital signal and determine whether the digital signal violates one or more predetermined criteria.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention. This disclosure refers to domains of differing security levels by referring to a higher confidentiality level domain and a lower confidentiality domain. As one of ordinary skill in the art will readily recognize, the present invention as applicability for any cross-domain solution, including transmission between two domains having the same security level, and the discussion of higher and lower confidentiality is merely illustrative of the preferred embodiments.

A UDP packet data filter is described herein which detects potential security violations in packets, preferably MPEG-2 Transport Stream (TS) packets, carrying metadata, preferably Key Length Value (KLV). In overview, this filter may perform the following steps:

1. Scan each UDP packet for TS packet headers;
2. Construct Packetized Elementary Stream (PES) packet headers from TS packet payloads;
3. Parses KLV metadata to identify any security tags present therein; and
4. Based on an analysis of the security tags: a. Blocks UDP packets from transmission, or b. Provides auditing and alert messages on detection of data security violations (This allows the filter to forward UDP packets in real time while scanning processes proceed in parallel or on an independent thread.)

In addition, in addition to blocking based on security violations, the filter disclosed herein is also capable of blocking transmission of UDP blocks based on other characteristics of the received UDP blocks, as discussed in more particular detail below. In terms of the options presented above of either immediately blocking UDP packets or instead providing auditing and alert messaging upon the detection of data security violations, the inventors have found that while only minimal latency in UDP packet forwarding is tolerable to views of the filtered video stream, much higher latency values are generally tolerable for detection of security violations that trigger audit and alert methods. The second option above provides a relatively low transfer latency for the video stream and in effect decouples the transfer latency from the filter processing latency.

Figure 1:
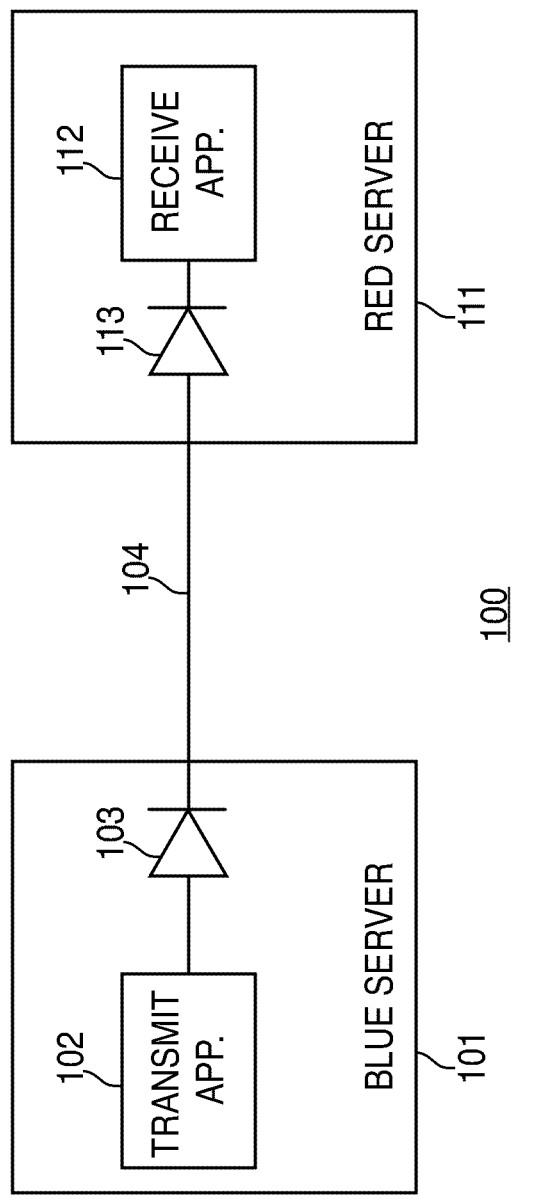
FIG. 1 is a block diagram of a conventional one-way data transfer system.
Figure 2:
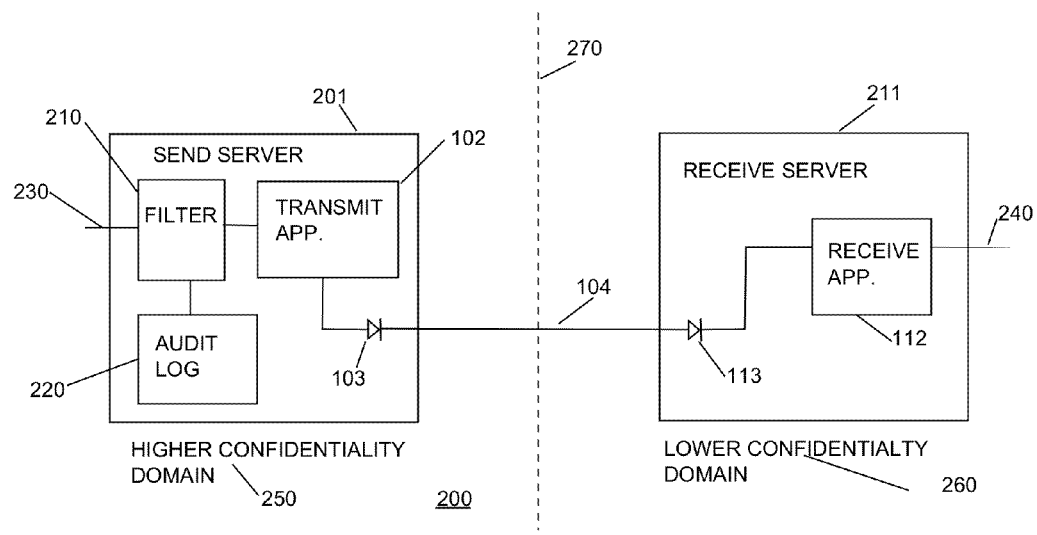
FIG. 2 is a block diagram of an embodiment according to the present invention.

Referring now to the drawings and in particular to the embodiment shown in FIG. 2, a system 200 for transferring information from a higher confidentiality level domain 250 to a lower confidentiality level domain 260 includes a send server 201 within the higher confidentiality level domain 250 and a receive server 211 within the lower confidentiality level domain 260. The send server 201 is connected to the receive server 211 via an optical link 104, in the same manner as the conventional system shown in FIG. 1. Send server 201 receives information for transfer, e.g., TS packets included within UDP packets and constituting a video signal, at an input 230 that is coupled to a filter 210. Filter 210 processes the received UDP packets and determines, based on a comparison of the particular content thereof with certain predetermined criteria, whether the UDP packets include information that indicates that the cross-domain transfer constitutes a security violation or otherwise has characteristics indicating that malware or other undesired content is included within the packets. As discussed herein, the predetermined criteria may relate to one or more of the following: packet formatting; metadata message content (including but not limited to a stated security level); metadata message formatting.

If filter 210 identifies a security violation or undesired content, filter 210 may block the UDP packets from being passed as an output of the filter 210. Filter 210 may also generate an alert message and/or make an entry in an audit log 220 upon the identification of a security violation or undesired content. In a further embodiment, filter 210 may strip the metadata from the UDP packets, in whole or in part, to remove any information included therein which should not be released into the lower confidentiality domain 260. For example, metadata including information having a high level of precision may be modified to have a much lower level of precision or even to materially change the information. As one of ordinary skill in the art will readily recognize, there are many ways to modify such information to either reduce the precision thereof or to intentionally obfuscate such information. As an example, such metadata may include location information. Using the present invention, such location information could be modified to have less precision (making it difficult to precisely target such location) or could be modified to reflect a completely different location (with the same effect). The output of filter 210 is provided to a transmit application 102, and then to a transmit component 103. Transmit application 102 and transmit component 103 operate in the same manner as in the FIG. 1 system. From transmit component 103, the filtered signal is then provided, via the optical link 104, to optical detector 113 in the receive server 211 and then, in turn, to receive application 112 for processing. After processing by receive application 112, the received signal comprising a filtered TS signal is provided to an output 240 of the receive server 211 for further processing, viewing, etc. As evident in FIG. 2, the filtered TS signal in the form of UDP packets is provided across the boundary 270 between the higher confidentiality domain 250 and the lower confidentiality domain 260.

Filter 210 analyzes the UDP packets comprising the TS signal and may be configured to analyze the received UDP packets and perform one of three possible operations:

1. Forward received packets in real time but copy to memory for analysis and then, if "bad" packets are identified, block transfer of additional received packets immediately (and, optionally, record an identified security violation or undesired content occurrence in a log and/or generate an alert message). This operation decouples transfer latency from filter latency while limiting the bandwidth of bad packets passed forward.

2. Always forward the received packets, but copy any "bad" packets to a memory for further analysis (and generate an alert message upon identification of a security violation or undesired content occurrence). This operation maintains access to a live video feed while fully accepting the risk that data contains security violations. This operation may also be used as an optional override feature in the case of a false positive finding in the first option above (or in the situation where the live video feed is needed no matter the risk).

3. Queue all packets for analysis and block transfer of packets which are identified as "bad." This provides the most secure operation but creates the longest latency because all packets must be cached and analyzed before being forwarded.

In connection with operations 1 and 3 above, filter 210 may also strip out the metadata, in whole or in part, if the particular content of such metadata contains information which should not be released into the lower security domain.

The first operation is discussed in more detail below with respect to FIG. 4. As one of ordinary skill in the art will readily recognize, the second and third operations are variants of the first operation and the audit log 220 may be used with any of these operations, in further embodiments, to record all instances of security violations or undesired content occurrences.

Figure 3:
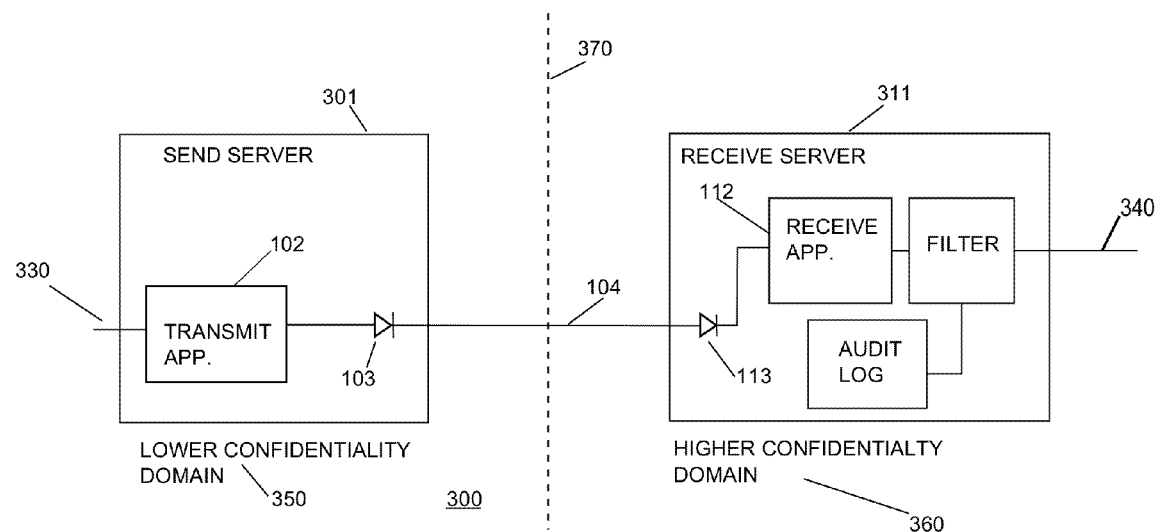
FIG. 3 is a block diagram of an alternative embodiment according to the present invention.

Referring now to the embodiment shown in FIG. 3, a system 300 for transferring information from a lower confidentiality level domain 350 to a higher confidentiality level domain 360 includes a send server 301 within the lower confidentiality level domain 350 and a receive server 311 within the higher confidentiality level domain 360. As with the embodiment of FIG. 1, the send server 301 is connected to the receive server 311 via an optical link 104, in the same manner as the conventional system shown in FIG. 1. Send server 301 receives information for transfer, e.g., TS data included within UDP packets and constituting one or more video signals, at an input 330 that is coupled to transmit application 102 and then to transmit component 103. Transmit application 102 and transmit component 103 operate in the same manner as in the FIG. 1 system. From transmit component 103, the signal is then provided, via the optical link 104, to optical detector 113 in the receive server 311 and then, in turn, to receive application 112 for processing. After processing by receive application 112, the signal is provided to filter 310, which is optionally coupled to an audit log 320, which, as discussed below, allows the system to record instances of security violations. Filter 310 operates in an identical manner to filter 210 of FIG. 2, as discussed in more detail with respect to FIG. 4. The filtered TS signal is provided by filter 310 to an output 340 of the receive server 211 for further processing, viewing, etc. As evident in FIG. 3, the video signal in the form of TS packets within UDP packets is provided across the boundary 370 between the higher confidentiality domain 350 and the lower confidentiality domain 360.

Figure 4:
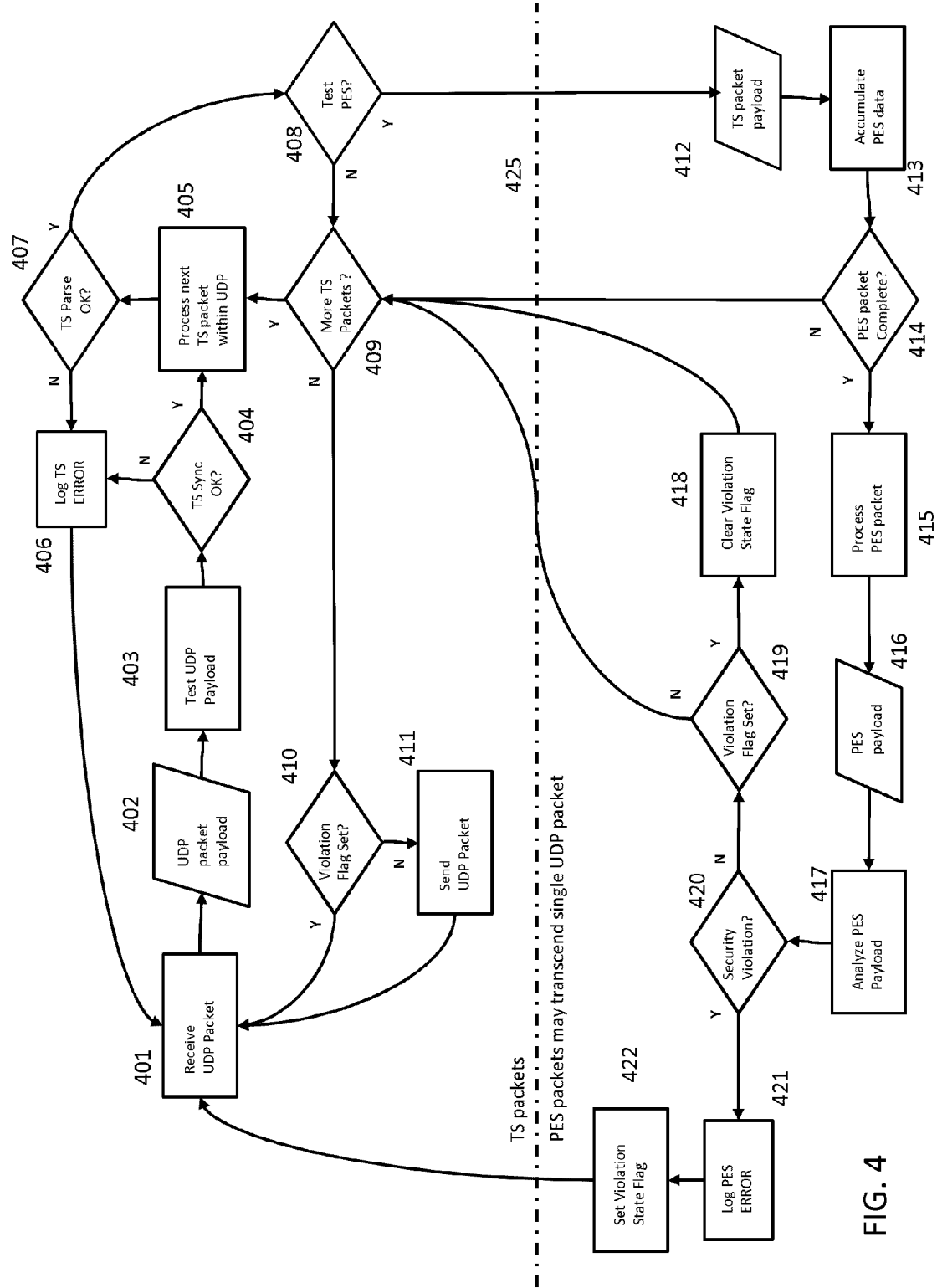
FIG. 4 is a flowchart of the filtering algorithm according to the present invention.
Figure 5:
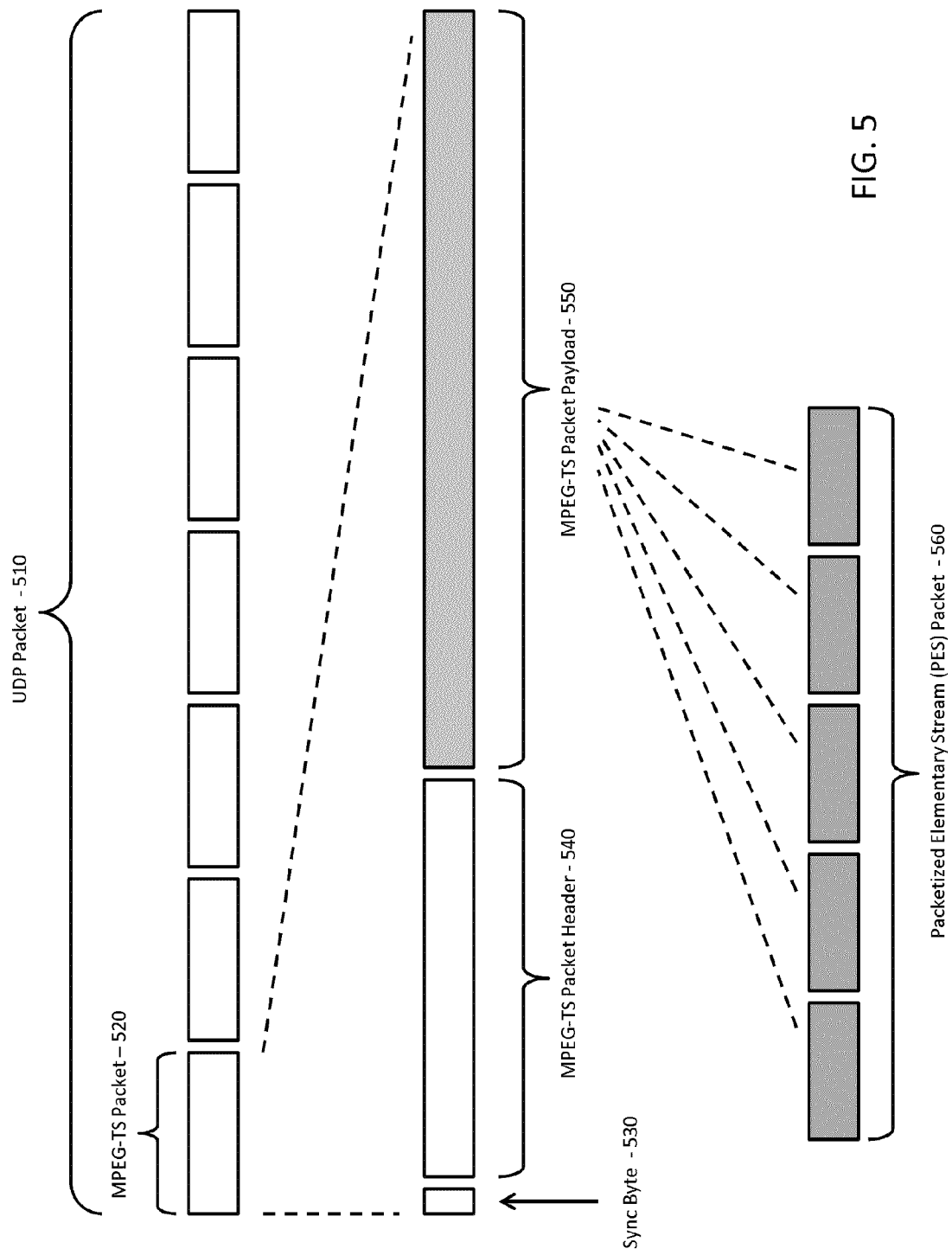
FIG. 5 is a chart showing the UDP packet payload for use with the present invention.

In a first mode of operation, the filter disclosed herein (filter 210 in FIG. 2 and filter 310 in FIG. 3) operates on received UDP packets in accordance with the flowchart 400 shown in FIG. 4. As shown in FIG. 5, a UDP packet 510 comprises a number (seven) of TS packets 520. Each TS packet 520 includes a sync byte 530, a packet header 540 and a packet payload 550. The packet payload consists of a number of Packetized Elementary Stream (PES) packets 560. The UDP packet is received at step 401 in FIG. 4. The UDP packet payload is extracted at step 402 and tested at step 403. If the TS sync of the TS packets within the current UDP packet is found to be correct at step 404, the individual TS packets are then sequentially processed in a loop starting at step 405. The TS sync byte has a fixed value, i.e., 0x47h, and is always, without exception, the first byte of each TS packet. If the TS sync is not found to be correct at step 404 (i.e., if the proper value is not found at the seven expected locations within each UDP packet), the content of the received UDP packet is bad and processing proceeds by optionally logging the TS error at step 406 (within the audit log 220) and then moving back to step 401 to receive and process the next UDP packet (the bad UDP packet is not forwarded).

At step 405, the current TS packet is processed and then TS parsing is tested at step 407 by ensuring that each TS packet contains the proper internal attributes. If the current TS packet is not okay at step 407, the content of the received UDP packet is bad and processing proceeds to step 406 for optional logging of the error and then back to step 401 to receive the next UDP packet. If the current TS packet is okay at step 407, processing proceeds to step 408, which checks if PES processing is enabled (if PES processing is not enabled, then the filter blocks passage of the UDP packets only based on lack of proper formatting of the received packet, e.g., TS sync or TS parse errors, and not based on any metadata content). If not enabled, processing moves to step 409, which determines if there are more TS packets to analyze. If there are more TS packets, processing loops back to step 405. Otherwise, if all the TS packets within the current UDP packet have been processed, processing moves to step 410, where a check of the violation flag is made. If the violation flag has not been set, the current UDP packet is forwarded as an output at step 411 and processing reverts to step 401 to receive and process the next UDP packet. If a violation flag has been set, processing moves to step 401 without forwarding the current UDP packet by skipping step 411.

Figure 6:
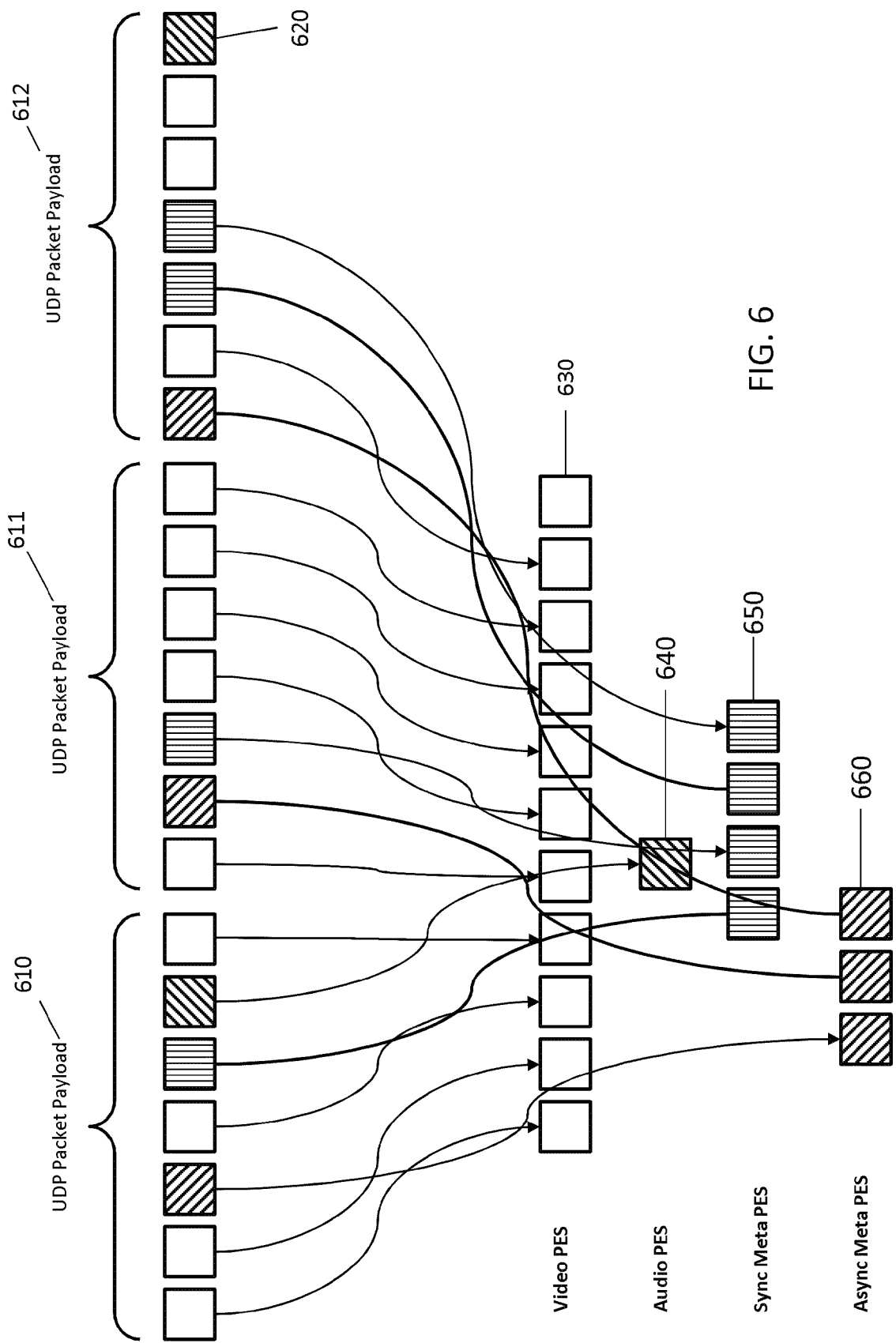
FIG. 6 is a chart showing how KLV data is extracted from UDP packets.

Continuing with FIG. 4, when PES processing is implemented (and identified at step 408), the payload of the current TS packet is retrieved at step 412 and the PES data of interest, e.g., KLV metadata, is accumulated at step 413. A diagram showing how the PES data is stored within the payload portions of the TS packets within the UDP packets is shown in FIG. 6. In FIG. 6, a series of UDP packets 610, 611, 612 each include seven TS packets 620. Four different types of TS packet payloads are shown in FIG. 6, including Video PES 630, Audio PES 640, Sync Meta PES 650 and Async Meta PES 660. The Sync Meta PES 650 and Async Meta PES 660 packets may constitute the KLV metadata. The packets are not evenly distributed within the UDP packets, so a complete PES packet may transcend a single UDP packet. Thus, the filter disclosed herein accumulates PES data by extracting the appropriate packet payloads, in a manner as shown in FIG. 6, as each TS packet is processed. At step 414 of FIG. 4, it is determined if the current PES packet is complete (the current PES packet, for example, comprising a predetermined number of associated TS packet payloads such as the four Sync Meta PES packet payloads 650 shown in FIG. 6 or the three Async Meta PES packet payloads shown in FIG. 6). If the current PES packet is not complete, processing returns to step 409 discussed above for continued operation on the present or next UDP packet, depending on the outcome of step 409. If the current PES packet is found to be complete at step 414, the PES packet is processed at step 415, the payload is extracted at step 416 and the payload is analyzed at step 417.

Continuing with FIG. 4, if, at step 420, the content of the current PES packet payload is found to constitute a security violation, a PES error is (optionally) logged at step 421, the violation flag is set at step 422 and processing reverts to step 401 to process the next UDP packet. An alert message may also be generated upon the setting of the violation flag. The current UDP packet is not transmitted in this embodiment and, since the violation flag is set, subsequent UDP packets will not be transmitted until the security violation is cleared. In the alternative, the metadata may be stripped from the UDP packets and the modified versions of the UDP packets, which do not include the metadata content found to constitute a security violation, may be alternatively transmitted from the filter (instead of blocking the transmission of the originally received UDP packets which include the bad content). If the contents of the current PES packet payload is not found to constitute a security violation at step 420, the status of the violation flag is checked at step 419, and if set, it is cleared at step 418. Thereafter, processing returns to step 409 for continued processing as discussed above.

The system disclosed herein can be configured to identify security violations in a UDP video packet stream which are identified, for example, by comparing the security level of the received video signal as embedded in the KLV data with the security level of the domain receiving the video signal. Of course, as one of ordinary skill in the art will readily recognize, any information stored within the KLV data, including but not limited to security level, may be compared with predetermined criteria in the system disclosed herein to determine whether the associated video signal is authorized or not (with unauthorized video constituting a security violation). Further, the system disclosed herein can also identify improperly formatted video data in a UDP video packet stream which could constitute malware, botnets, or other potentially harmful information, generally referred to herein as "undesired content." Once the security violation or undesired content is identified, the filter may block all subsequent UDP blocks until the security violation or undesired content ceases. Alternatively, the filter can allow the UDP blocks to pass, while logging and/or signaling the occurrence of the security violation and/or undesired content. The filter can be set, in one mode, to pass UDP blocks upon receipt and process such blocks in the background, in which case a limited number of "bad" blocks, i.e., blocks with a security violation or undesired content, might be passed before the existence of the bad block or blocks is identified and the UDP block stream stopped. In an alternative mode, the UDP blocks may be queued and only released once the associated metadata is analyzed and cleared. The former mode provides better transfer latency for the UDP blocks, but the latter mode ensures that no "bad" blocks are passed. In a still further alternative mode, the UDP blocks may be continually passed, but upon detection of a security violation or undesired content, the existence thereof can be logged and/or an alert message may be generated.

As one of skill in the art will readily recognize, KLV is a data encoding standard that is often used to embed information in video signal feeds. KLV is defined in SMPTE 336M-2007 (Data Encoding Protocol Using Key-Length Value) as approved by the Society of Motion Picture and Television Engineers. According to this standard, items are encoded into Key-Length-Value fields, where the key field identifies the data, length field specifies the length of the data, and value field is the data itself. The allowable entries for each of the Key, Length and Value fields may be tabulated in libraries. According to the present embodiment, if a KLV object fails to conform to the defined standards as tabulated in an associated library, such object may be treated as a security violation.

The embodiment described above operates on TS data transmitted as UDP packets. As one of ordinary skill in the art will readily recognize, the filtering operations presented herein may be applied to any digital data transmitted in a protocol featuring multi-level packetization. As such, although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. In a system for transmitting a digital signal from a first server to a second server, the digital signal comprised of a sequence of packets, each packet comprised of a sequence of a predetermined number of packet payloads, each of the packet payloads comprising a portion of data information or a portion of a complete metadata sequence, the first server coupled to the second server via a one-way data link, a filter having an input for receiving the digital signal and an output, the filter configured to analyze the digital signal, extract and store each packet payload comprising a portion of the complete metadata sequence, and, after storing the complete metadata sequence, determine whether the digital signal violates one or more predetermined criteria based on an analysis of the complete metadata sequence.

2. The system of claim 1, wherein the filter is within the first server.

3. The system of claim 1, wherein the filter is within the second server.

4. The system of claim 1, wherein the filter is configured to block the digital signal from passing to the output of the filter when the digital signal violates the one or more predetermined criteria.

5. The system of claim 4, wherein the filter is also configured to generate an alert message and/or record a message in a log file when the digital signal violates the one or more predetermined criteria.

6. The system of claim 1, wherein the filter is configured to allow the digital signal to pass to the output of the filter and to generate an alert message and/or record a message in a log file when the digital signal violates the one or more predetermined criteria.

7. The system of claim 1, wherein the one or more predetermined criteria comprises a format structure of the packets.

8. The system of claim 1, wherein the one or more predetermined criteria comprises a predetermined security level.

9. The system of claim 8, wherein the first server has a first security level and the second server has a second different security level; wherein the first security level is higher than the second security level; and wherein the predetermined security level is the same as the second security level.

10. The system of claim 8, wherein the first server has a first security level and the second server has a second different security level; wherein the second security level is higher than the first security level; and wherein the predetermined security level is the same as the first security level.

11. The system of claim 1, wherein the filter analyzes the digital signal by comparing the complete metadata sequence with the one or more predetermined criteria to determine if the digital signal violates the one or more predetermined criteria.

12. The system of claim 11, wherein the one or more predetermined criteria comprises a predetermined content of the complete metadata sequence.

13. The system of claim 11, wherein the complete metadata sequence has a predetermined format structure and the one or more predetermined criteria comprises the predetermined format structure of the complete metadata sequence.

14. The system of claim 11, wherein the filter, upon determination of a violation, modifies a current packet by removing each packet payload comprising a portion of the complete metadata sequence therefrom and passes the modified current packet to the output of the filter.

15. The system of claim 11, wherein the filter, upon determination of a violation, modifies a current packet by modifying one or more of the packet payloads comprising a portion of the complete metadata sequence to reduce the precision of information included therein and passes the modified current packet to the output of the filter.

16. The system of claim 11, wherein the filter, upon determination of a violation, modifies a current packet by modifying one or more of the packet payloads comprising a portion of the complete metadata sequence to obfuscate information included therein and passes the modified current packet to the output of the filter.

17. The system of claim 11, wherein the filter, upon determination of a violation, modifies a current packet by modifying one or more of the packet payloads comprising a metadata sequence to alter information included therein and passes the modified current packet to the output of the filter.

18. The system of claim 11, wherein the digital signal comprises Transport Stream packets within UDP packets.

19. The system of claim 18, wherein the complete metadata sequence comprises KLV data within the Transport Stream packets.

20. The system of claim 1, wherein the filter prevents each packet from passing to the output of the filter until after the determination of whether a current packet violates one or more predetermined criteria is complete.

21. The system of claim 1, wherein the filter immediately forwards each packet to the output of the filter and performs the determination of whether a current packet violates one or more predetermined criteria in a background operation.

22. A system for transmitting a digital signal which is comprised of a sequence of packets, each packet comprised of a sequence of a predetermined number of packet payloads, each of the packet payloads comprising a portion of data information or a portion of a complete metadata sequence, comprising:
 a first server having a first security level;
 a filter within the first server having an input for receiving a digital signal and an output, wherein the filter is configured to analyze the digital signal, extract and store each packet payload comprising a portion of the complete metadata sequence, and, after storing the complete metadata sequence, determine whether the digital signal violates one or more predetermined criteria based on an analysis of the complete metadata sequence;
 a one-way transmission system having an input coupled to the output of the filter and an output; and
 a second server having a second security level, the second server coupled to the output of the one-way transmission system.

23. The system of claim 22, wherein the filter is configured to block the digital signal from passing to the output of the filter when the digital signal violates the one or more predetermined criteria.

24. The system of claim 23, wherein the filter is also configured to generate an alert message and/or record a message in a log file when the digital signal violates the one or more predetermined criteria.

25. The system of claim 22, wherein the filter is configured to allow the digital signal to pass to the output of the filter and to generate an alert message and/or record a message in a log file when the digital signal violates the one or more predetermined criteria.

26. The system of claim 22, wherein the one or more predetermined criteria comprises a format structure of the packets.

27. The system of claim 22, wherein the one or more predetermined criteria comprises a predetermined security level.

28. The system of claim 27, wherein the first security level is higher than the second security level and the predetermined security level is the same as the second security level.

29. The system of claim 27, wherein the second security level is higher than the first security level and the predetermined security level is the same as the first security level.

30. The system of claim 22, wherein the filter analyzes the digital signal by comparing the complete metadata sequence with the one or more predetermined criteria to determine if the digital signal violates one or more predetermined criteria.

31. The system of claim 30, wherein the one or more predetermined criteria comprises a predetermined content of the complete metadata sequence.

32. The system of claim 30, wherein the complete metadata sequence has a predetermined format structure and the one or more predetermined criteria comprises the predetermined format structure of the complete metadata sequence.

33. The system of claim 30, wherein the filter, upon determination of a violation, modifies a current packet by removing one or more of the packet payloads comprising a portion of the complete metadata sequence therefrom and passes the modified current packet to the output of the filter.

34. The system of claim 30, wherein the filter, upon determination of a violation, modifies a current packet by modifying one or more of the packet payloads comprising a portion of the complete metadata sequence to reduce the precision of information included therein and passes the modified current packet to the output of the filter.

35. The system of claim 30, wherein the filter, upon determination of a violation, modifies a current packet by modifying one or more of the packet payloads comprising a portion of the complete metadata sequence to obfuscate information included therein and passes the modified current packet to the output of the filter.

36. The system of claim 30, wherein the filter, upon determination of a violation, modifies a current packet by modifying one or more of the packet payloads comprising a portion of the complete metadata sequence to alter information included therein and passes the modified current packet to the output of the filter.

37. The system of claim 30, wherein the digital signal comprises Transport Stream packets within UDP packets.

38. The system of claim 37, wherein the complete metadata sequence comprises KLV data within the Transport Stream packets.

39. The system of claim 22, wherein the filter prevents each packet from passing to the output of the filter until after the determination of whether the digital signal violates one or more predetermined criteria is complete.

40. The system of claim 22, wherein the filter immediately forwards each packet to the output of the filter and performs the determination of whether the digital signal violates one or more predetermined criteria in a background operation.

41. A system for transmitting a digital signal which is comprised of a sequence of packets, each packet comprised of a sequence of a predetermined number of packet payloads, each of the packet payloads comprising a portion of a data information or a portion of a complete metadata sequence, comprising:
- a first server having a first security level;
- a one-way transmission system having an input within the first server for receiving a digital signal and an output;
- a second server having a second security level, the second server coupled to the output of the one-way transmission system; and
- a filter within the second server having an input coupled to the output of the one-way transmission system and an output, wherein the filter is configured to analyze the digital signal, extract and store each packet payload comprising a portion of the complete metadata sequence, and, after storing the complete metadata sequence, determine whether the digital signal violates one or more predetermined criteria based on an analysis of the complete metadata sequence.

42. The system of claim 41, wherein the filter is configured to block the digital signal from passing to the output of the filter when the digital signal violates the one or more predetermined criteria.

43. The system of claim 42, wherein the filter is also configured to generate an alert message and/or record a message in a log file when the digital signal violates the one or more predetermined criteria.

44. The system of claim 41, wherein the filter is configured to allow the digital signal to pass to the output of the filter and to generate an alert message and/or record a message in a log file when the digital signal violates the one or more predetermined criteria.

45. The system of claim 41, wherein the one or more predetermined criteria comprises a format structure of the packets.

46. The system of claim 41, wherein the one or more predetermined criteria comprises a predetermined security level.

47. The system of claim 46, wherein the first security level is higher than the second security level and the predetermined security level is the same as the second security level.

48. The system of claim 46, wherein the second security level is higher than the first security level and the predetermined security level is the same as the first security level.

49. The system of claim 41, wherein the filter analyzes the digital signal by comparing the complete metadata sequence with the one or more predetermined criteria to determine if the digital signal violates the one or more predetermined criteria.

50. The system of claim 49, wherein the filter, upon determination of a violation, modifies a current packet by removing one or more of the packet payloads comprising a portion of the complete metadata sequence therefrom and passes the modified current packet to the output of the filter.

51. The system of claim 49, wherein the one or more predetermined criteria comprises a predetermined content of complete metadata sequence.

52. The system of claim 49, wherein the complete metadata sequence has a predetermined format structure and the one or more predetermined criteria comprises the predetermined format structure of the complete metadata sequence.

53. The system of claim 49, wherein the filter, upon determination of a violation, modifies a current packet by modifying one or more of the packet payloads comprising a portion of the complete metadata sequence to reduce the precision of information included therein and passes the modified current packet to the output of the filter.

54. The system of claim 49, wherein the filter, upon determination of a violation, modifies a current packet by modifying one or more of the packet payloads comprising a portion of the complete metadata sequence to obfuscate information included therein and passes the modified current packet to the output of the filter.

55. The system of claim 49, wherein the filter, upon determination of a violation, modifies a current packet by modifying one or more of the packet payloads comprising a portion of the complete metadata sequence to alter information included therein and passes the modified current packet to the output of the filter.

56. The system of claim 49, wherein the digital signal comprises Transport Stream packets within UDP packets.

57. The system of claim 56, wherein the complete metadata sequence comprises KLV data within the Transport Stream packets.

58. The system of claim 41, wherein the filter prevents each packet from passing to the output of the filter until after the determination of whether the current packet violates one or more predetermined criteria is complete.

59. The system of claim 41, wherein the filter immediately forwards each packet to the output of the filter and performs the determination of whether the current packet violates one or more predetermined criteria in a background operation.

* * * * *